Figure 1:
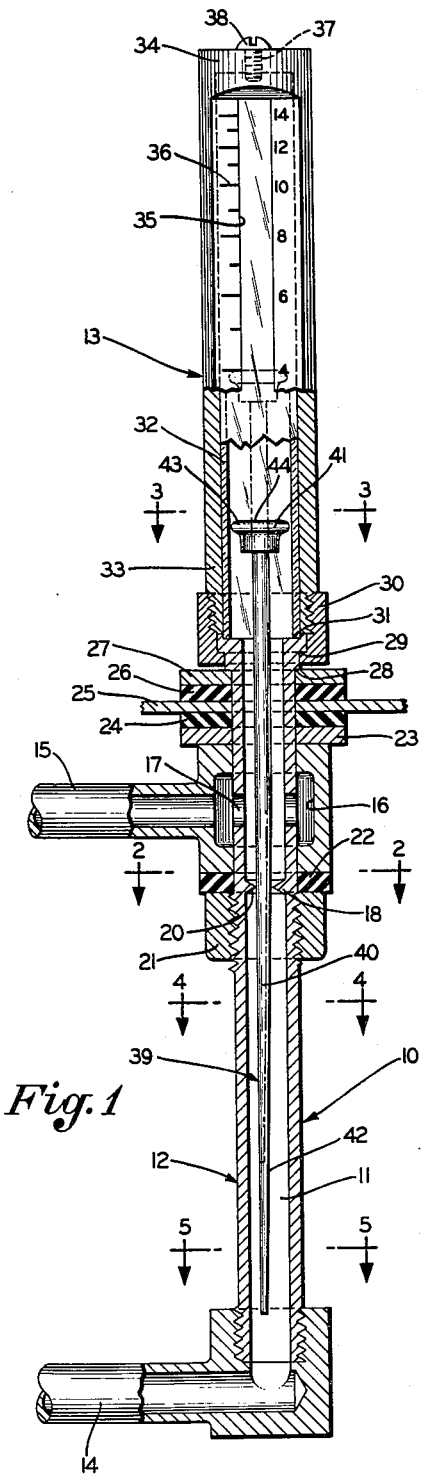

Jan. 14, 1964  W. F. GREEN  3,117,446
FUEL FLOW METER CONSTRUCTION
Filed April 6, 1962

INVENTOR.
Walter F. Green
BY
Frease, Bishop, Johns & Schick
ATTORNEYS

United States Patent Office 3,117,446
Patented Jan. 14, 1964

3,117,446
FUEL FLOW METER CONSTRUCTION
Walter F. Green, 4431 Logan Ave. NW.,
Canton, Ohio
Filed Apr. 6, 1962, Ser. No. 185,599
2 Claims. (Cl. 73—210)

My invention relates to improvements in fuel flow meters, and more specifically, to a fuel flow meter of the type having a vertically upwardly extending sight glass for directly visually indicating the flow rate of fuel therethrough. Even more specifically, my invention relates to a fuel flow meter of the foregoing type which makes it possible to obtain accurate flow rate indications for extremely small rates of flow.

Certain prior constructions of fuel flow meters of the type having an upwardly extending sight glass portion through which fuel flow rates may be visually observed or indicated have included a freely vertically slidable rod, the upper end of which is received in the sight glass portion to provide the visible indications, and the lower end of which has been provided with a horizontally positioned circular disk. The circular disk is positioned freely vertically slidable in a downwardly tapering metering chamber, that is, a chamber of considerable vertical extent which decreases progressively in circular cross section from the top to the bottom thereof.

The fuel inlet is normally provided below the metering chamber and the fuel outlet above the metering chamber, or between the metering chamber and the sight glass portion, so that as fuel flows upwardly through the tapered metering chamber, it must flow between edges of the rod circular disk and the walls of the metering chamber. Thus, as the rate of fuel flow increases, the circular disk and rod will be forced to move upwardly, and as the rate of fuel flow decreases, the disk and rod will move downwardly. For this reason, the upper end of the rod in the sight glass portion may be used for direct visual indication of the proportionate rates of fuel flow and by proper calibration, the amounts of fuel flow may be read directly.

The theory of this prior construction of fuel flow meter is that a constant pressure difference will always be maintained between the sides of the disk on the rod lower end, with proper consideration being taken of the weight of the rod and disk which is always a constant. Thus the fluid flow rate is directly proportional to the area of the opening between the disk and the sides of the chamber. As increased amounts of fluid flow through the device the pressure under the disk tends to rise and this increased pressure lifts the disk and rod until the opening has again increased to become directly proportional to the increased flow.

Where fluid flow rates are large, no particular difficulty would be expected. However, to measure the small rates of fuel flow such as might be required for automotive engines, the area of the opening required becomes extremely small (at idling speeds only a few thousandths of a square inch) and the clearance between the rod and chamber cannot be sufficient to permit unrestricted flow. Under these conditions, instead of being restricted by the opening between the disk and the chamber, the flow is also restricted by passing through a long small opening between the rod and chamber. Under these conditions, viscosity effects would become large enough to make accurate readings unobtainable.

A further objectionable factor in this prior form of fuel flow meters is that for flow meters of this type to be accurate, the tapered metering chamber must be formed extremely accurately and this is not only difficult, but of considerable expense. Only slight errors in machining of such a tapered metering chamber will result in extreme errors in fuel flow rate indications.

Certain attempts have been made to eliminate the foregoing disadvantages of this prior form of fuel flow meter by providing a stationary vertically extending metering needle, decreasing in cross section upwardly, extending into a sight glass portion and surrounded or telescoped by a freely vertically slidable annular metering member. In this arrangement, the annular member forms a constant diameter vertically movable orifice around the stationary metering needle and the outer extremities of this movable annular member must be slidably sealed against the vertically extending walls enclosing this metering chamber.

Although this improved form of fuel flow meter operates on the same theory of maintaining the pressure drop between the upper and lower sides of the movable annular member, taking into account the weight of this annular member which is a constant, thereby again providing flow rate indications such that the flow rate is directly proportional to the area of the opening, and although certain of the foregoing viscosity problems are reduced, further problems are introduced. The major problem introduced is the requirement for the outward slidable sealing of this movable annular member, since friction will then become a problem and friction, of course, reduces the sensitivity of the unit and the accuracy of the readings indicated.

It is, therefore, a general object of the present invention to overcome the difficulties of the prior constructions discussed in the foregoing, while still providing a visually indicating flow meter construction of maximum simplicity and adaptable to extremely small rates of flow.

It is a primary object of the present invention to provide a visually indicating fuel flow meter construction in which changes in the viscosity of fuel being metered do not have any appreciable effect even at the most minimum flow rates.

It is a further object of the present invention to provide a visually indicating fuel flow meter construction which incorporates a freely vertically movable metering needle in combination with a simple metering orifice, thereby eliminating expensive machining costs normally required for even the simplest fuel flow meter constructions of other forms.

Finally, it is an object of the present invention to provide a visually indicating fuel flow meter construction in which the accuracy of flow rate indication is not affected by changing viscosities of the fuel being metered, nor affected by considerations of friction between moving parts.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the fuel flow meter construction of the present invention may be stated as including a vertically extending tubular body having a vertically extending opening therethrough, with preferably a lower metering portion and an upper sight glass portion. The lower metering portion is formed with an annular generally horizontal restriction formed extending into the body opening forming a circular orifice within said body opening. Furthermore, a fuel inlet connection is provided into the body opening below the orifice and a fuel outlet connection is provided from the body opening above the orifice and preferably below the sight glass portion.

The sight glass portion forms an upper termination of the tubular body with a closed upper end of the sight glass portion forming the closed upper end of the body opening. Further, the sight glass portion is provided with a preferably transparent sight indicating window visually exposing the body opening substantially throughout the vertical height of the sight glass portion, with visual flow indications being formed on the sight glass portion adjacent said sight indicating window.

Finally, a metering needle is positioned freely vertically movable extending vertically in the body opening. This metering needle has a downwardly tapered portion, which is formed of progressively decreased cross section downwardly and which tapered portion is positioned extending through the orifice. The metering needle also has an upper end extending into the sight glass portion, which upper end is at all times visible through the transparent sight glass window.

For maximum results, it is preferred to form the metering orifice in the body opening as a knife-edge orifice. Further, for minimum expense of fabrication and maximum accuracy, it is preferred to form the metering needle of circular cross section having a flat chordal taper, and also to form the upper end of the metering needle enlarged to act as slidable guide means within the sight glass portion as well as to provide a convenient reference for visual flow indication.

Thus, with the construction of the present invention, the tapered metering needle will change vertical positions relative to the metering orifice with changes in fuel flow rates through the orifice, and by providing the proper indications on the sight glass portion, the rate of fuel flow may be directly visually read at the sight glass portion as indicated by the upper end of the metering needle.

Figure 2:
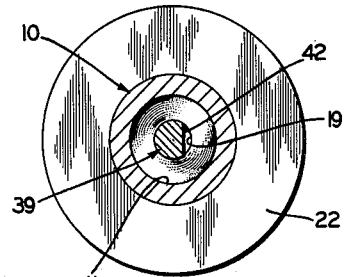
Figure 3:
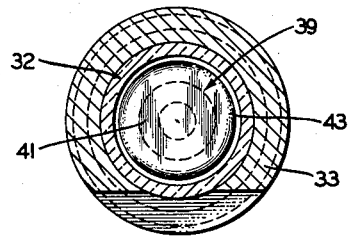
Figure 4:
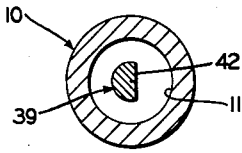
Figure 5:
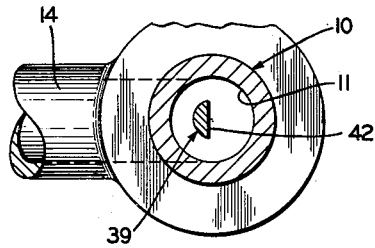

By way of example, an embodiment of the improved fuel flow meter construction of the present invention is illustrated in the accompanying drawings forming a part hereof, wherein like numerals indicate similar parts throughout the several views, and in which:

FIG. 1 is a front elevation, with parts broken away and in vertical section, showing the metering needle in its lowermost position in full lines and an intermediate vertical position in broken lines;

FIG. 2, an enlarged sectional view, part in elevation, looking in the direction of the arrows 2—2 in FIG. 1;

FIG. 3, an enlarged sectional view, part in elevation, looking in the direction of the arrows 3—3 in FIG. 1;

FIG. 4, an enlarged sectional view, looking in the direction of the arrows 4—4 in FIG. 1; and FIG. 5, an enlarged sectional view, part in elevation, looking in the direction of the arrows 5—5 in FIG. 1.

Referring to the drawings, the embodiment of the fuel flow meter construction of the present invention illustrated includes a main tubular vertically extending body, generally indicated at 10, having a vertically extending opening 11 extending substantially the entire vertical height of body 10. Further, body 10 is formed with a lower metering portion, generally indicated at 12, and an upper sight glass portion, generally indicated at 13.

The metering portion 12 is formed with a fuel inlet connection 14 threadably received on the lower end of body 10 communicating with the body opening 11 and otherwise sealing off the lower end of body 10. A fuel outlet connection 15 is formed telescopically surrounding the body 10 intermediate the vertical height thereof and near the upper end of the metering portion 12, with this fuel outlet connection 15 communicating with the body opening 11 through a cylindrical chamber 16 surrounding body 10 and fuel outlet openings 17 formed through body 10 into the body opening 11.

Spaced below the fuel outlet connection 15, the body 10 is formed with an annular restriction 18 extending into the body opening 11 and forming a circular metering orifice 19. The restriction 18 is preferably formed tapering inwardly to a circular knife-edge 20, as shown, so that changes in viscosity of fuel flowing through the metering orifice 19 will have little effect on the flow indications of the construction, even at the minimum flow rates.

The fuel outlet connection 15 is maintained properly positioned surrounding the body 10 and properly positioned relative to the fuel outlet openings 17 by a lower collar 21 threadably received over body 10, which collar bears upwardly against a resilient sealing washer 22 positioned between fuel outlet connection 15 and collar 21.

The upper end of the fuel outlet connection 15 abuts a metal washer 23, which washer 23 underlies a resilient sealing washer 24 underlying a representative mounting member 25, which may be, for instance, the cowling covering an automobile engine. Overlying the mounting member 25 is another resilient sealing washer 26, in turn covered by another metal washer 27, which last metal washer 27 abuts a shoulder 28 formed on the body 10. Thus, not only is the fuel outlet connection maintained properly positioned by the collar 21, but also the entire fuel flow meter construction is maintained mounted on a mounting member 25 by this collar 21.

The sight glass portion 13 of body 10 begins immediately above shoulder 28 and is first formed with a shoulder 29, receiving a collar 30 engaged therewith. At this point also, the body 10 is formed with an enlarged seating portion 31 inwardly of collar 30, which seating portion receives the lower end of the tubular transparent sight glass 32 and the lower end of the surrounding tubular sight glass cover 33, with collar 30 being threadably engaged with cover 33.

Sight glass cover 33 is formed with a closed upper end 34 and a sighting window 35 extending substantially the entire vertical length of cover 33 but terminating spaced downwardly from the closed upper end 34. Thus, the sight glass 32 extends between seating portion 31 and the closed upper end 34 of cover 33, but this sight glass is exposed outwardly through cover 33 the extent of the sighting window 35.

Flow graduations 36 are formed on the sight glass cover 33 adjacent the sighting window 35, as shown, and for a purpose to be hereinafter described. Furthermore, an air relief opening 37 is formed through the closed upper end 34 of the sight glass cover 33 closed by a screw 38 again for a purpose to be hereinafter described.

A metering needle is generally indicated at 39 having a cylindrical or circular cross section metering portion 40 and an indicating head portion 41. The metering needle 39 is mounted freely vertically movable in the opening 11 of body 10 with the metering portion 40 extending downwardly from within the sight glass portion 13 into the metering portion 12 through the circular metering orifice 19. Furthermore, the indicating head portion 41 is mounted at the upper end of the metering portion 40 or the upper end of the metering needle 39, so that this indicating head portion is positioned within and surrounded by the tubular sight glass 32 of the sight glass portion 13.

The metering portion 40 of the metering needle 39, starting spaced slightly below the indicating head portion 41 and extending downwardly, is inwardly tapered downwardly, as indicated at 42, so that this metering portion decreases progressively in cross section at a predetermined and precalculated rate downwardly to the lower end thereof, where there is a minimum cross section.

The rate of taper is determined by certain considerations to be hereinafter discussed more in detail and also determines the location of the flow rate graduations 36 adjacent the sighting window 35 in the sight glass portion 13, but for ease and simplicity of manufacture, as well as maximum accuracy, this taper 42 is preferably formed as a tapering chordal flat on the metering portion 40 of the metering needle 39, as is clearly shown in FIGS. 2, 4 and 5.

The indicating head portion 41 on the upper end of the metering needle 39 is preferably formed with a vertically arcuate outwardly extending generally circular flange portion 43 having a flat top surface 44 and being of slightly less circular dimensions than the internal circular dimensions of the tubular sight glass 32. Thus this indicating head portion 41 serves as a guide for the metering needle 39 within the sight glass 32 while still permitting free vertical movement of the metering needle 39. At the same time, the flat top surface 44 of this indicating head portion 41 serves as an indicating line as sighted through the sighting window 35 and can compare against the indicating graduations 36.

At the commencement of operation of the flow meter construction of the present invention, fuel flows into the body opening 11 through the fuel inlet connection 14, upwardly through the circular metering orifice 19 between this orifice and taper 42 of the metering needle 39, and out through the body fuel outlet openings 17 and fuel outlet connection 15. At the same time the fuel will rise upwardly into the sight glass portion 13, by the indicating head portion 41 of metering needle 39, and completely fill this sight glass portion and the tubular sight glass 32 thereof. At this commencement, it is necessary to loosen the screw 38 to permit all of the air within the sight glass portion 13 to escape and when this sight glass portion is completely filled with fuel, screw 38 is tightened to prevent the escape of fuel therefrom.

As the flow of fuel increases and decreases the metering needle 39 will automatically move upwardly and downwardly proportionate to such flow and to provide greater or less opening through the circular metering orifice 19 between the circular knife-edge 20 of this orifice and the tapered metering needle 39. Sufficient clearance is provided between the indicating head portion 41 of metering needle 39 to permit substantially the free flow of fuel thereby, in both vertical directions, so that movement of the metering needle vertically upwardly and downwardly is not restricted to any great extent. By varying this clearance between the indicating head portion 41 of metering needle 39 and the internal surface of the tubular sight glass 32, however, it is possible to provide a certain dampening effect as desired, so that the metering needle 39 is not subject to minor quick fuel flow variations.

In calibrating the fuel flow meter construction of the present invention for determining the proper locations of the graduations 36 adjacent the sighting window 35 of the sight glass portion 13, such calibration can be accomplished either through actual physical test or by known mathematical calculations. It must be remembered, however, in view of the fact that the metering needle 39 is tapered and is working against a stationary circular metering orifice 19, that the pressure drop across the restriction is not constant. As the metering needle 39 rises, the weight being supported is constant but the area supporting it reduces so that the pressure drop across the restriction increases and flow rates are, therefore, not directly proportional to the area of the opening. Thus, it is necessary to take into account in such calibrations, varying pressure as well as a varying orifice opening area.

As hereinbefore stated, however, the calculations necessary for calibration may be readily accomplished by known mathematical formulas readily apparent to those skilled in the art. Furthermore, although such calibration is somewhat more involved than the straight line calibration of prior constructions, the disadvantages of being required to make such calculations are clearly outweighed by the advantages of the present invention.

In view of the fact that in present invention a tapered vertically movable metering needle acts against a knife-edge orifice, changes in viscosity of fuel have only a negligible effect, even at the minimum flow rates, so that accurate fuel flow readings may be made at such lower fuel flow rates. Furthermore, friction between the vertically moving metering needle and the other stationary parts of the present construction are likewise negligible.

Thus, a fuel flow meter construction is provided of the type in which flow rate readings may be visually indicated and observed over a complete range between minimum and maximum flow rates, yet the construction is of a maximum simplicity and may be provided at a minimum cost.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of preferred embodiment thereof, and the advantageous new and useful results obtained thereby, the new and useful construction and reasonable mechanical equivalents thereof obvious to those skilled in the art are set forth in the appended claims.

I claim:

1. Fuel flow meter construction including a vertically extending tubular body having a vertically extending opening formed therethrough, an annular restriction formed extending into the body opening intermediate the body terminating inwardly in a circular knife-edge forming a circular knife-edge metering orifice, fuel inlet means on the body below the orifice and fuel outlet means on the body above the orifice communicating with the body opening for directing fuel to the body upwardly through the orifice and from the body, the body terminating upwardly in an upwardly closed sight glass portion, a metering needle positioned freely vertically movable extending vertically in the body opening having a downwardly tapered portion extending through the orifice and an upper end extending into the body sight glass portion, the metering needle tapered portion being formed of progressively decreasing cross-section downwardly, the metering needle tapered portion being circular in cross-section and the taper thereof being formed by a tapering chordal flat, and the body sight glass portion having sight indicating means for visual indication of the metering needle upper end during fuel flow through the orifice around the metering needle tapered portion and changing positions of the metering needle relative to the orifice and body resulting from changes in fuel flow through the orifice.

2. Fuel flow meter construction as defined in claim 1 in which guide means is formed on the metering needle upper end conforming to and of slightly smaller dimensions than the body opening in the body sight glass portion.

References Cited in the file of this patent

UNITED STATES PATENTS

| 1,676,674 | St. John | July 10, 1928 |
| 2,293,987 | Krueger | Aug. 25, 1942 |
| 2,955,465 | Delaney | Oct. 11, 1960 |

FOREIGN PATENTS

| 429,431 | Germany | May 22, 1926 |